E. KESSLER.
HOSE COUPLING.
APPLICATION FILED JULY 9, 1915.

1,291,020.

Patented Jan. 14, 1919.

Inventor:
Ernst Kessler
by his attorneys

UNITED STATES PATENT OFFICE.

ERNST KESSLER, OF BASEL, SWITZERLAND.

HOSE-COUPLING.

1,291,020.  Specification of Letters Patent.  Patented Jan. 14, 1919.

Application filed July 9, 1915. Serial No. 38,863.

*To all whom it may concern:*

Be it known that I, ERNST KESSLER, a citizen of the Swiss Republic, residing at 15 Neuensteinerstrasse, Basel, Switzerland, have invented certain new and useful Improvements in Hose-Couplings, of which the following is a specification, reference being had to the accompanying drawings.

This invention relates to a hose coupling of novel construction which is so constituted that the air passage shall remain open both during traveling and in the event of a rupture of the pipes, the arrangement being such as, when coupling is effected, to cause the closing members to assume a position in which the passage is completely open and to remain in this position until the coupling is intentionally disconnected by hand.

Figure 1:
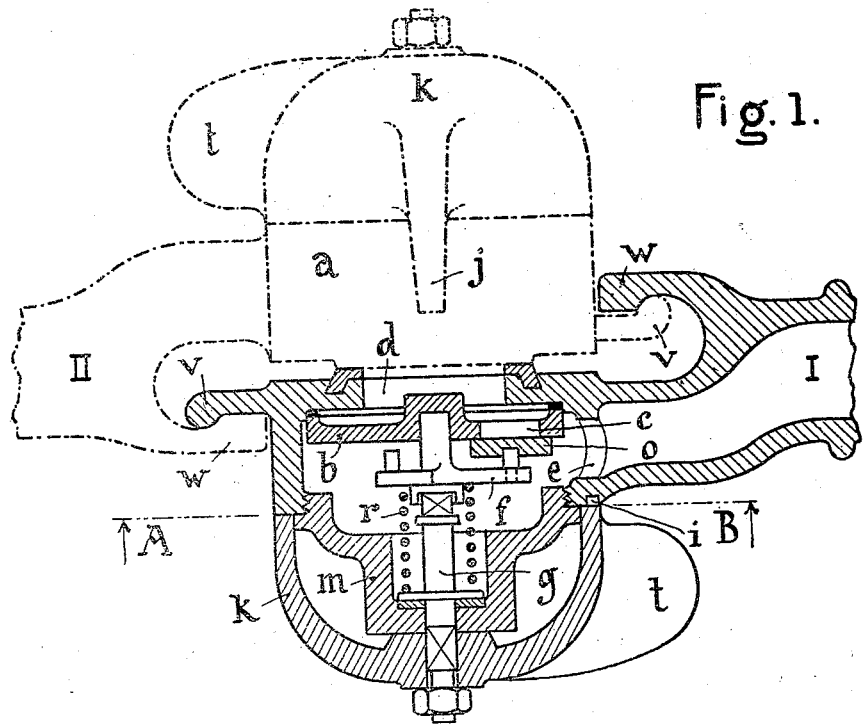
Figure 2:
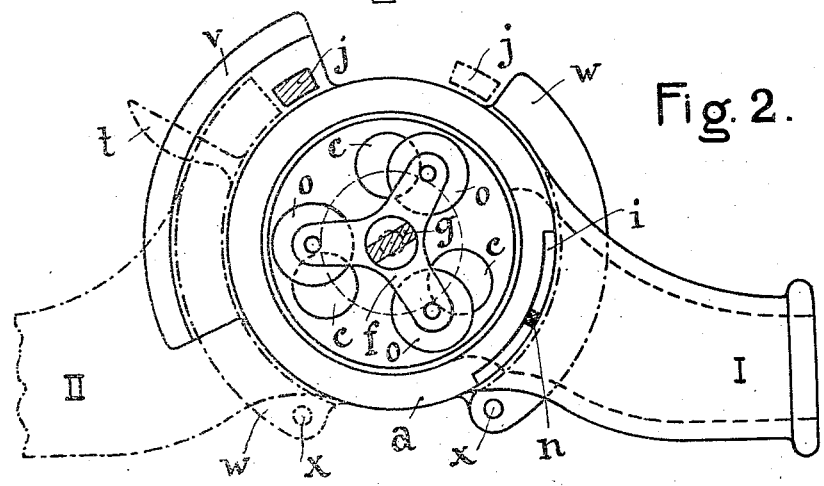

The accompanying drawings illustrate by way of example a hose coupling in accordance with this invention, adapted to be used in connection with railway carriage pressure brakes. In the lower half of Figure 1 there is shown a horizontal section through the couple-head I, while in its upper half there is shown in plan in dot and dash lines the coupler-head II, the construction of which is precisely similar to that of the head I. Fig. 2 is a sectional front view on the line A—B of Fig. 1, showing the closing devices in the half open position and the other movable parts of the hose coupling in a corresponding central position.

In the casing $a$ which, as usual, is constructed to form the head of the ordinary hose coupling of a compressed air brake there is built-in a perforated diaphragm $b$, which in the example illustrated is furnished with three circular perforations $c$ arranged at angular intervals of 120° apart. It is most convenient that the perforations should be three in number as a most uniform transmission of pressure to the closing devices is thus insured. The cross-sectional area of these perforations is such, or may easily be made such, that their sum corresponds to the cross-sectional area of the passage of the pipe. Each of the perforations may be closed by means of a separate valve disk $o$ of some yielding or packing material. Each disk $o$ is pivotally attached to one of the arms of a three-armed carrier $f$, the axis of rotation of which coincides with the geometrical axis of the casing $a$. The carrier $f$ is connected by means of a spindle $g$ with a bell-shaped cover $k$ to rotate therewith, said cover being rotatable in a direction opposite to that of casing $a$. In the hollow of the casing $a$ there is fitted a box-nut $m$, in the interior of which there is mounted a helical spring $r$ wound around the spindle $g$ and serving to press the carrier $f$, and consequently also the disks $o$ against the plate or diaphragm $b$. The edge of the cover $k$, which slides upon the front edge of the casing $a$, is provided with a projection $n$ which engages with the segmental groove $i$, provided in the front edge of the casing $a$ and extending over an arc of 60°. Attention must be directed to the fact that the weight of the hose coupling is not borne by the projection $n$, but is taken up by stops $x$ attached to abutment piece $w$ provided on the coupler-heads, and each, to effect coupling, engaging with extensions $v$ on the other coupling head.

The cover $k$ is provided with a locking arm $j$ running approximately parallel to the axis of the casing and a laterally projecting lug or wing $t$ which can be conveniently gripped and serves as a handle. The arm $j$ of the head I, after the two heads have been connected together, comes into proximity to the segmental abutment $w$ attached to the head II and serving as a guide for the coupling extension $v$, while the corresponding arm on the cover of the head II is located in proximity to or in the path of the abutment $w$ of the head I which serves as a guide for the extension $v$ of the head II. The abutment pieces are consequently employed to effect the operation of the locking of the arms $j$; this arrangement being adopted in the case of the construction illustrated in the drawings in order to enable a coupler-head in accordance with this invention to be coupled with any head of ordinary construction, the wing $t$, which is quite outside the path of any part of the head to be coupled, serves to unlock and reverse the arm $j$ and as a handle for disconnecting the hose-coupling. The wings $t$ of the heads I and II are located diametrically opposite each other.

When the two heads I and II are brought together the extension $v$ of the head I will project into the abutment piece $w$ of the head II and will by this means acquire the necessary guidance, while at the same time the extension $v$ of the head II will project into the abutment piece $w$ of the head I and consequently likewise be correctly guided. Both heads can then be rotated around the geometrical axes of their casings, by which means a coupling is effected. During the rotation of the heads their abutments $w$ will come in contact with the locking arms $j$ of the two covers $k$, with the result that the latter together with the carriers $f$ and the disks $o$ are likewise rotated, by which means the said disks are brought into the position in which they leave the perforation $c$ of the plate $b$ completely open, so that it is the coupling action itself which completely and positively opens the passage $d$ which now must remain open under all circumstances, no matter to what shocks the hose pipes, into which the hose-coupling described is inserted, are subjected, even should there occur a rupture of the vehicle coupling mechanism and a consequent tearing asunder of the hose-coupling. By this means mechanism is provided for effecting the breaking of the two portions of the train in an absolutely reliable manner.

The uncoupling of the hose-coupling is effected by taking hold simultaneously of both the heads by the wings $t$ and raising them, by which means the positions of the disks $o$ of both heads will be simultaneously reversed, that is to say, caused to assume the closed position and the heads finally caused to come apart.

What I claim is:—

1. A hose coupling having a pair of coupling heads, each head comprising a casing having an extension and an abutment, a valve seat, a rotary carrier, a plurality of valve disks pivoted to the carrier, a carrier-spindle, a rotatable cover engaged by the spindle and a projection on the cover located in the path of the abutment of the other head, the abutment of either coupling head being adapted to engage the extension and the cover-projection of the other head.

2. A hose coupling having a pair of coupling heads, each head comprising a casing having an extension and an abutment, a valve seat, a rotary carrier, a plurality of valve disks pivoted to the carrier, a carrier-spindle, a box nut encompassing the spindle, a spring housed within said nut and engaging the carrier, a rotatable cover engaged by the spindle, and a projection on the cover located in the path of the abutment of the other head, the abutment of either coupling head being adapted to engage the extension and the cover-projection of the other head.

3. A hose coupling having a pair of coupling heads, each head consisting of two parts rotatable on the common axis of both heads but in opposite directions to one another, one of these parts comprising a casing having an extension, an abutment and a diaphragm, while the other part comprises a cover having a locking arm, a handle, a carrier on a spindle operatively connected to the cover, and a plurality of valve disks pivoted to said carrier opposite to the diaphragm, the abutment of either coupling head being adapted to engage the extension and the locking arm of the other head.

4. A hose coupling having a pair of coupling heads, each head consisting of two parts rotatable on the common axis of both heads, but in opposite directions to one another, one of these parts comprising a casing having an extension, an abutment and a diaphragm provided with three perforations spaced 120° apart, while the other part comprises a cover having a locking arm, a handle, a three-arm carrier on a spindle operatively connected to the cover, and three valve disks spaced 120° apart and pivoted to the carrier-arms opposite to the diaphragm, the abutment of either coupling head being adapted to engage the extension and the locking arm of the other head.

ERNST KESSLER.

Copies of this patent may be obtained for five cents each, by addressing the "Commissioner of Patents, Washington, D. C."